(12) United States Patent
Liao

(10) Patent No.: US 12,296,801 B2
(45) Date of Patent: May 13, 2025

(54) OIL FILLING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 124 days.

(21) Appl. No.: 18/184,167

(22) Filed: Mar. 15, 2023

(65) Prior Publication Data
US 2023/0392525 A1 Dec. 7, 2023

(30) Foreign Application Priority Data

Jun. 1, 2022 (TW) .................................. 111120348

(51) Int. Cl.
*B60T 17/22* (2006.01)
*F01M 11/04* (2006.01)

(52) U.S. Cl.
CPC ........... *B60T 17/222* (2013.01); *F01M 11/04* (2013.01)

(58) Field of Classification Search
CPC .................. B60T 17/222; F01M 11/04; F01M 2011/0491

USPC ........................................................ 188/352
See application file for complete search history.

(56) References Cited

U.S. PATENT DOCUMENTS 5,470,276 A * 11/1995 Burnell ................. F24F 13/075
454/319
2021/0300315 A1* 9/2021 Liu ........................ B60T 17/222

\* cited by examiner

*Primary Examiner* — Lindsay M Low
*Assistant Examiner* — Omar Morales
(74) *Attorney, Agent, or Firm* — Muncy, Geissler, Olds & Lowe, P.C.

(57) ABSTRACT

An oil filling device is provided, including: a main body, configured to cover an open end portion of an oil pot, including at least one first sliding portion and a channel; a control member, rotatably disposed on the main body; two clamping members, at least one of the two clamping members including a second sliding portion slidably mounted to the at least one first sliding portion; at least one guiding unit, each of the at least one guiding unit including a guiding groove and an assembly portion; at least one positioning member, connected to the assembly portion and slidably disposed within the guiding groove, wherein rotation of the control member operates to control at least one of the two clamping members to move relative to the main body so that the two clamping members relatively approach to or distance away from each other.

9 Claims, 6 Drawing Sheets

OIL FILLING DEVICE

BACKGROUND OF THE INVENTION

Field of the Invention

The present invention relates to an oil filling device.

Description of the Prior Art

Generally, in order to achieve labor-saving effect, the brake system of the vehicle generally uses a hydraulic actuation mechanism. It is an issue that the brake fluid will deteriorate after a period of use and needs to be replaced, so it is necessary to drain the used brake fluid in the oil pot and inject new brake oil. It is necessary to avoid the inflow of air and avoid the overflow of brake oil during the oil replacement process. The connection potion of the oil filling device needs to be closely matched with the spout of the oil pot; however, in order to closely match the spout and the filling tool, the conventional way is to rely on manpower to hold the filling tool, which is inconvenient. Additionally, the oil pots of vehicles of different brands and models are different, so it is necessary to prepare various connection portions for the filling tool, which will cause high maintenance cost and inefficient operation.

The present invention is, therefore, arisen to obviate or at least mitigate the above-mentioned disadvantages.

SUMMARY OF THE INVENTION

The main object of the present invention is to provide an oil filling device which can be applied to various oil pots with various dimensions.

To achieve the above and other objects, an oil filling device configured to be applied to an oil pot including an open end portion is provided, including: a main body, configured to cover the open end portion, including at least one first sliding portion and a channel, the channel being in communication with the oil pot; a control member, rotatably disposed on the main body and rotatable about an axial direction; two clamping members, at least one of the two clamping members including a second sliding portion slidably mounted to the at least one first sliding portion; at least one guiding unit, each of the at least one guiding unit including a guiding groove which extends in a direction oblique to a radial direction of the control member, and an assembly portion; at least one positioning member, each of the at least one positioning member being connected to one said assembly portion and slidably disposed within one said guiding groove, wherein rotation of the control member operates to control at least one of the two clamping members to move relative to the main body so that the two clamping members relatively approach to or distance away from each other.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
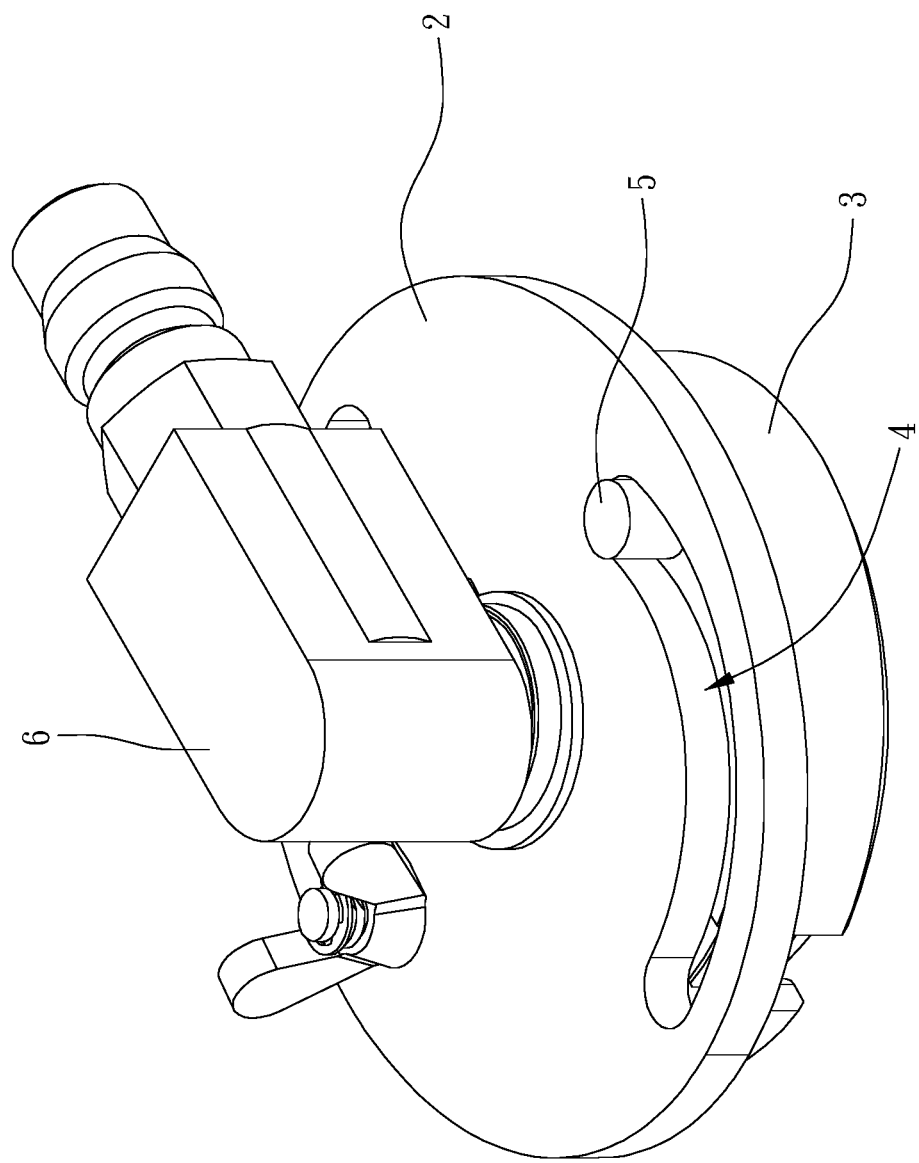
FIG. 1 is a stereogram of a preferable embodiment of the present invention.
Figure 2:
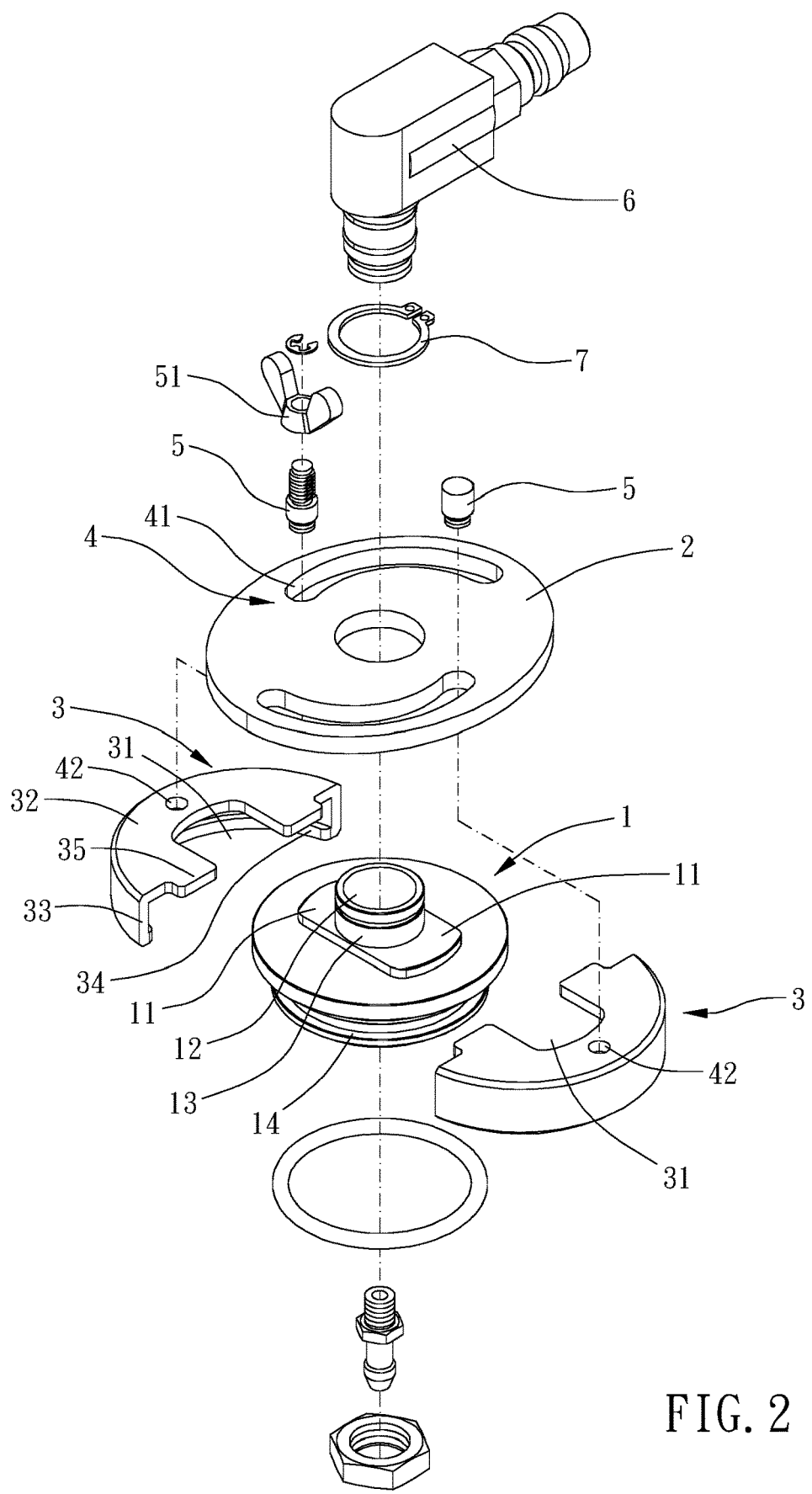
FIG. 2 is a breakdown drawing of a preferable embodiment of the present invention.
Figure 3:
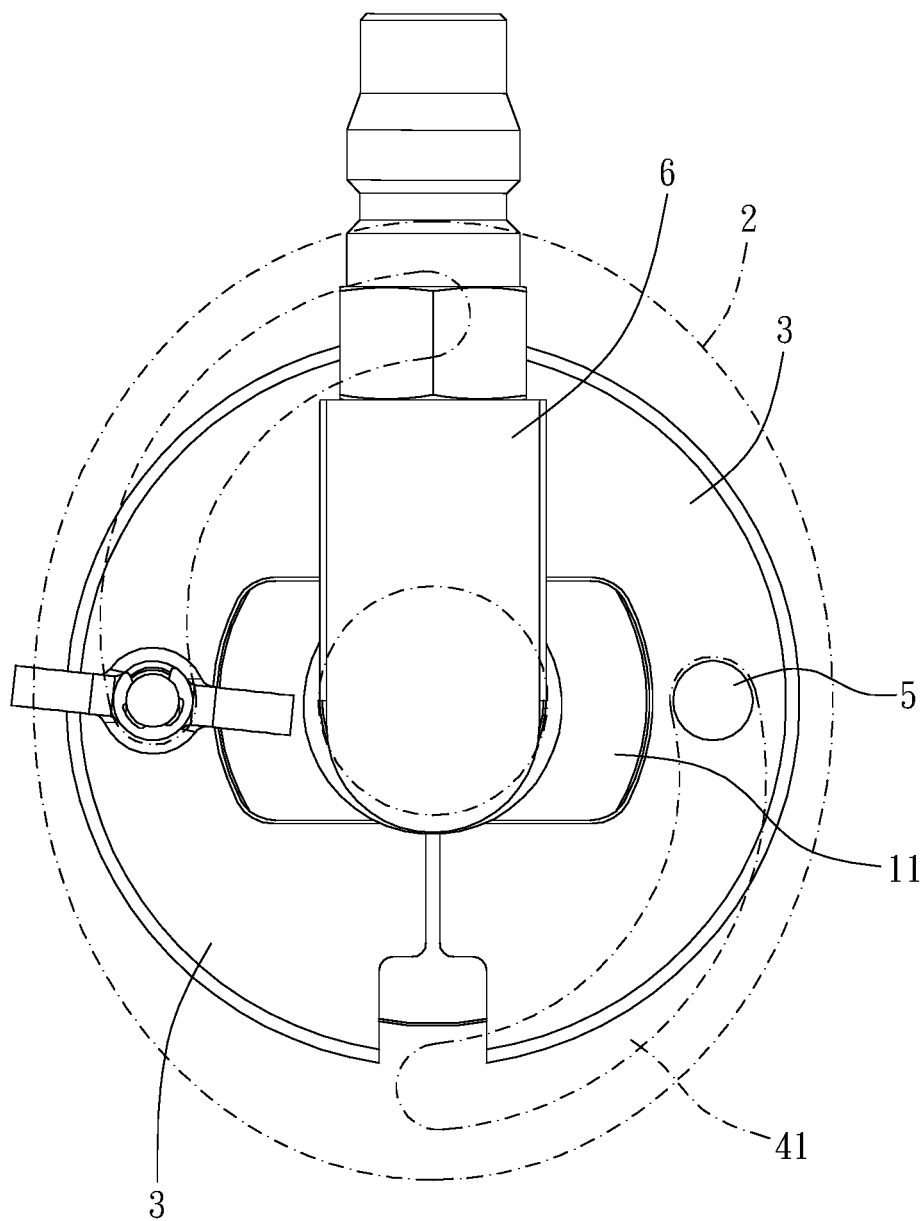
FIGS. 3 to 5 are drawings showing operation of a preferable embodiment of the present invention.
Figure 4:
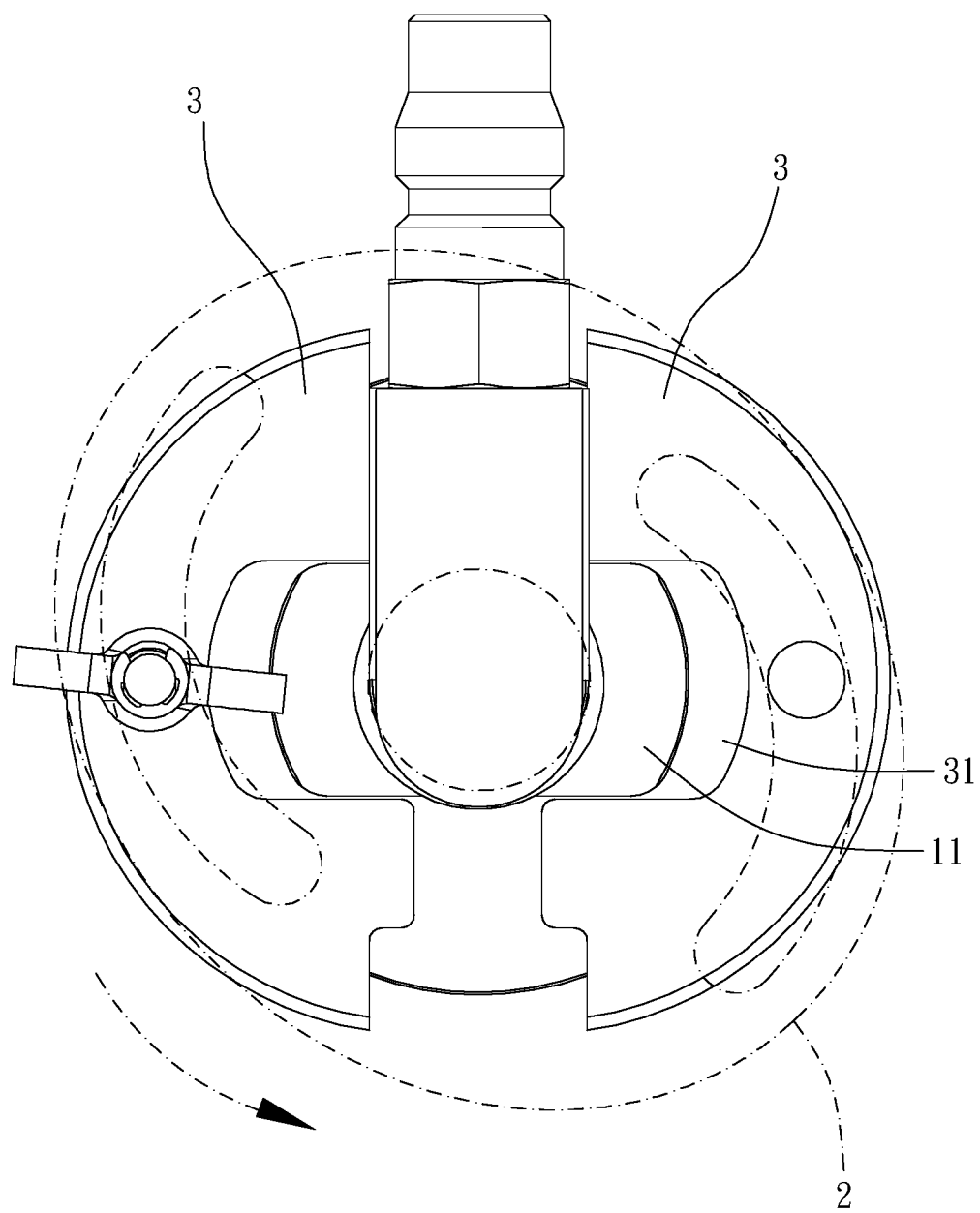
Figure 5:
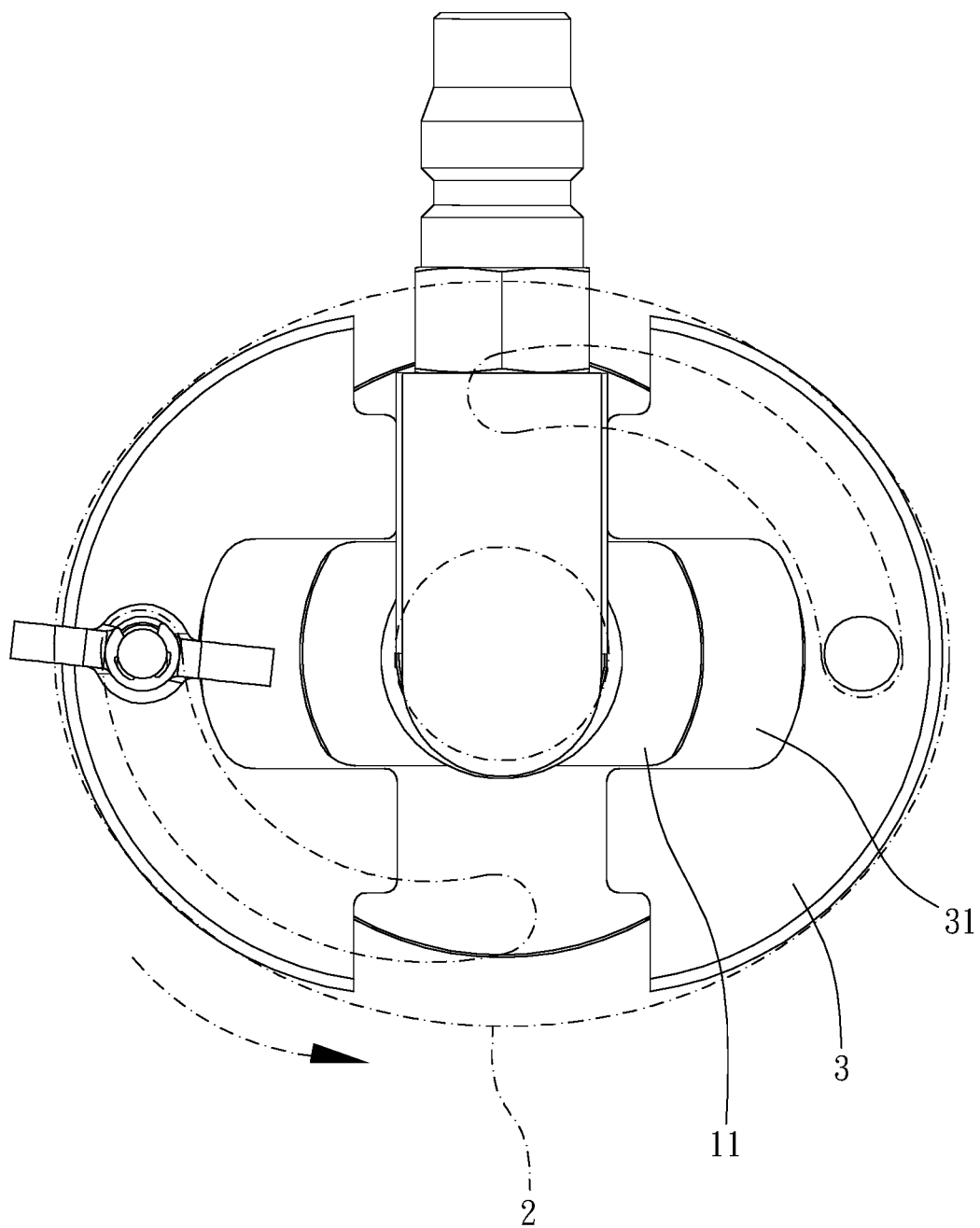
Figure 6:
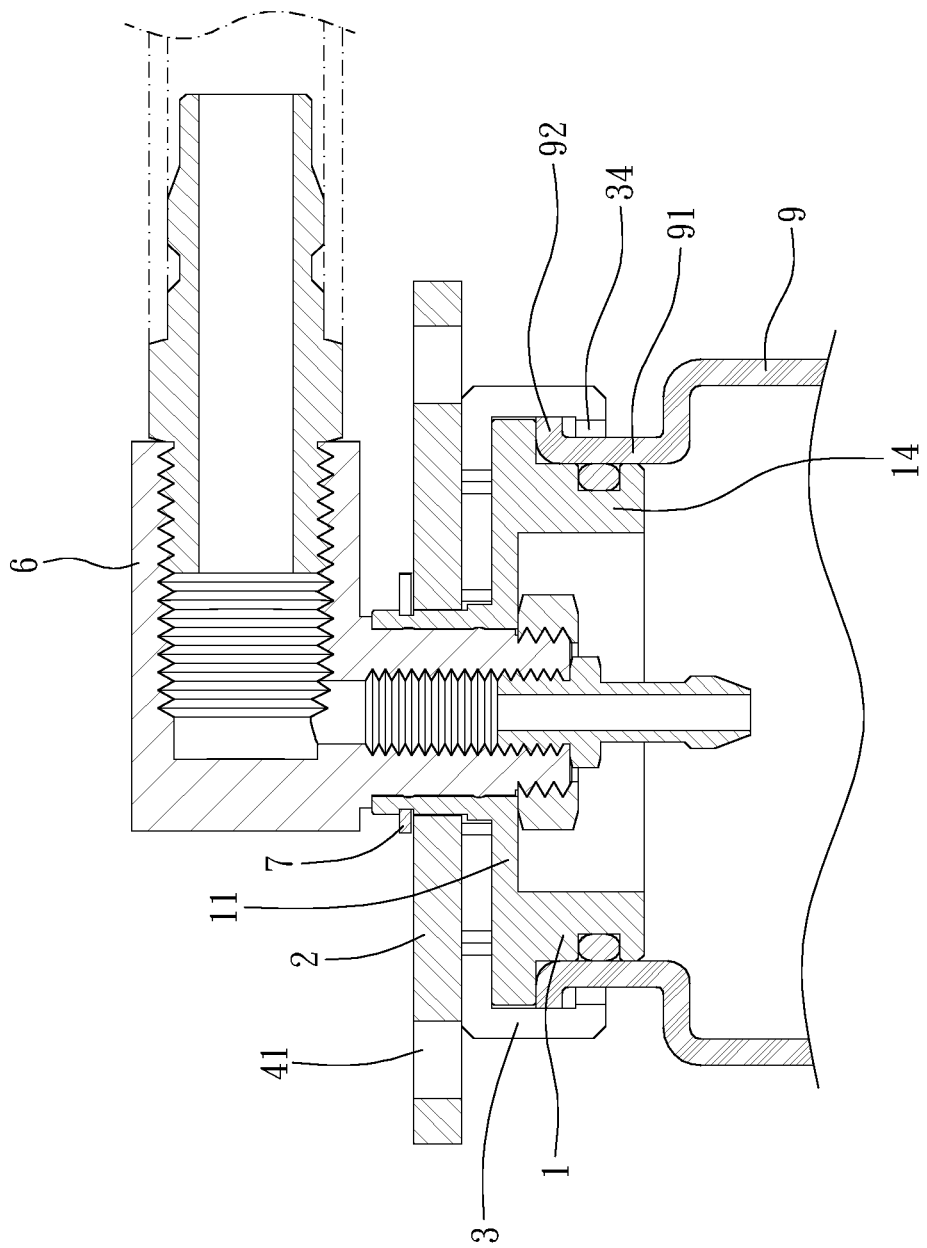
FIG. 6 is a cross-sectional view of a preferable embodiment of the present invention.

Please refer to FIGS. 1 to 6 for a preferable embodiment of the present invention. An oil filling device of the present invention is configured to be applied to an oil pot 9 including an open end portion 91. The oil filling device includes a main body 1, a control member 2, two clamping members 3, at least one guiding unit 4 and at least one positioning member 5.

The main body 1 is configured to cover the open end portion 91 and includes at least one first sliding portion 11 and a channel 12, and the channel 12 is in communication with the oil pot 9.

The control member 2 is rotatably disposed on the main body 1 and rotatable about an axial direction.

At least one of the two clamping members 3 includes a second sliding portion 31 slidably mounted to the at least one first sliding portion 11.

Each of the at least one guiding unit 4 includes a guiding groove 41 which extends in a direction oblique to a radial direction of the control member 2, and an assembly portion 42.

Each of the at least one positioning member 5 is connected to one said one said assembly portion 42 and slidably disposed within one said guiding groove 41. Rotation of the control member 2 operates to control at least one of the two clamping members 3 to move relative to the main body 1 so that the two clamping members 3 relatively approach to or distance away from each other, which is easy to clamp the open end portion of one of oil pots with various opening dimensions such that the main body 1 can be attached to the open end portion 91 stably, and the oil can flow into the oil pot 9 via the channel 12.

Specifically, at least one the first sliding portion 11 projects and extends radially on a side of the main body 1 facing toward the control member 2, and the second sliding portion 31 is a recess within which one said first sliding portion 11 is slidably engaged so that it allows the clamping member 3 to move radially relative to the main body 1.

An extension tube 13 extends axially on the side of the main body 1 facing toward the control member 2, the extension tube 13 defines the channel 12, the at least one first sliding portion 11 extends radially from the extension tube 13, and the control member 2 is rotatably disposed around the extension tube 13. The main body further includes an insertion portion 14 on a side remote from the extension tube 13, and the channel 12 extends through the insertion portion 14. The insertion portion 14 is configured to be inserted in the open end portion 91 to avoid leakage of the oil.

In this embodiment, the extension tube 13 the at least one first sliding portion includes two first sliding portions 11 which extend radially from opposing sides of the extension tube 13 respectively, and each of the two clamping members 3 includes one said second sliding portion 31. As such, each of the two clamping members 3 is slidable relative to the main body 1, which provides a large travelling range of the two clamping members 3.

Preferably, the oil filling device further includes an adapter 6, the adapter 6 is inserted in an end of the extension tube 13 remote from the two clamping members 3, and the adapter 6 is configured to be in communication with an oil source.

In this embodiment, the oil filling device includes two guiding units 4, each of the two guiding grooves 41 extends arcedly, and a center of curvature of each said guiding groove 41 is eccentric to the axial direction. When the control member 2 rotates, the positioning member 5 slides along the guiding groove 41 so that the clamping member 3 is driven to move.

In this embodiment, each of the two clamping members 3 includes a top wall 32, a side wall 33 and an engaging portion 34. The side wall 33 is connected to and between the top wall 32 and the engaging portion 34, and the top wall 32 of each of the two clamping members 3 includes one said second sliding portion 31 recessed radially. The engaging portion 34 of each of the two clamping members 3 is configured to be engaged with a flange 92 of the open end portion 91, which prevents the two clamping members 3 from detaching from the open end portion 91 in the axial direction. Specifically, the top wall 32 of each of the two clamping members 3 includes two projections 35 extending toward the extension tube 13, and the second sliding portion 31 is located between the two projections 35.

The top wall 32 of each of the two clamping members 3 further includes one said assembly portion 42 which is a through hole, and each of the at least one positioning member 5 is inserted in one said assembly portion 42. In this embodiment, each of the at least one positioning member 5 is screwed to one said assembly portion 42, a restricting member 51 is connected to the at least one positioning member 5, the restricting member 51 is blockably located at a side of the control member 2 remote from the two clamping members 3, and the restricting member 51 has a diametric dimension larger than a width of the guiding groove 41 so that it avoids detachment of the control member 2 from the positioning member 5.

Preferably, a retainer 7 is engaged on the extension tube 13, and the retainer 7 is abutted against the side of the control member 2 remote from the two clamping members 3, which avoids detachment of the control member 2 from the extension tube 13.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An oil filling device configured to be applied to an oil pot including an open end portion, including:
   a main body, configured to cover the open end portion, including at least one first sliding portion and a channel, the channel being in communication with the oil pot;
   a control member, freely rotatably disposed around a portion of the main body and rotatable about an axial direction;
   two clamping members, at least one of the two clamping members including a second sliding portion slidably mounted to the at least one first sliding portion;
   at least one guiding unit, each of the at least one guiding unit including a guiding groove which extends in a direction oblique to a radial direction of the control member, and an assembly portion; and
   at least one positioning member, each of the at least one positioning member being connected to one said assembly portion and slidably disposed within one said guiding groove, wherein rotation of the control member operates to control at least one of the two clamping members to move relative to the main body so that the two clamping members relatively approach to or distance away from each other;
   wherein the control member is in a non-threaded engagement with the main body, and rotation of the control member causes no axial movement of the control member relative to the main body;
   wherein the at least one first sliding portion projects and extends radially on a side of the main body facing the control member, the second sliding portion is a recess, and the at least one first sliding portion projects to be within the recess so that the two clamping members are non-rotatable relative to the at least one first sliding portion and are only radially slidable along the at least one first sliding portion.

2. The oil filling device of claim 1, wherein an extension tube extends axially on the side of the main body facing toward the control member, the extension tube defines the channel, the at least one first sliding portion extends radially from the extension tube, and the control member is rotatably disposed around the extension tube.

3. The oil filling device of claim 2, wherein the at least one first sliding portion includes two first sliding portions which extend radially from opposing sides of the extension tube respectively, and each of the two clamping members includes one said second sliding portion.

4. The oil filling device of claim 3, further includes an adapter, wherein the adapter is inserted in an end of the extension tube remote from the two clamping members; the guiding groove of each of the at least one guiding unit extends arcedly, and a center of curvature of the guiding groove of each of the at least one guiding unit is eccentric to the axial direction; each of the two clamping members includes a top wall, a side wall and an engaging portion, the side wall is connected to and between the top wall and the engaging portion, the top wall of each of the two clamping members includes one said second sliding portion recessed radially, and the engaging portion of each of the two clamping members is configured to be engaged with a flange around the open end portion; the top wall of each of the two clamping members further includes one said assembly portion which is a through hole, and each of the at least one positioning member is inserted in one said assembly portion; each of the at least one positioning member is screwed to one said assembly portion, a restricting member is connected to the at least one positioning member, the restricting member is located at a side of the control member remote from the two clamping members, and the restricting member has a diametric dimension larger than a width of the guiding groove; a retainer is engaged on the extension tube, and the retainer is abutted against the side of the control member remote from the two clamping members; the top wall of each of the two clamping members includes two projections extending toward the extension tube, and the second sliding portion is located between the two projections; the main body further includes an insertion portion on a side remote from the extension tube, and the channel extends through the insertion portion.

5. The oil filling device of claim 2, further includes an adapter, wherein the adapter is inserted in an end of the extension tube remote from the two clamping members.

6. The oil filling device of claim 1, wherein the guiding groove of each of the at least one guiding unit extends arcedly, and a center of curvature of the guiding groove of each of the at least one guiding unit is eccentric to the axial direction.

7. The oil filling device of claim 1, wherein each of the two clamping members includes a top wall, a side wall and an engaging portion, the side wall is connected to and between the top wall and the engaging portion, the top wall of each of the two clamping members includes one said second sliding portion recessed radially, and the engaging portion of each of the two clamping members is configured to be engaged with a flange around the open end portion.

8. The oil filling device of claim 7, wherein the top wall of each of the two clamping members further includes one said assembly portion which is a through hole, and each of the at least one positioning member is inserted in one said assembly portion.

9. The oil filling device of claim 8, wherein each of the at least one positioning member is screwed to one said assembly portion, a restricting member is connected to the at least one positioning member, the restricting member is blockably located at a side of the control member remote from the two clamping members, and the restricting member has a diametric dimension larger than a width of the guiding groove.

\* \* \* \* \*